(12) United States Patent
Kruglick (10) Patent No.: US 10,015,559 B2
(45) Date of Patent: Jul. 3, 2018

(54) TRANSCODING DETECTION AND ADJUSTMENT OF CONTENT FOR OPTIMAL DISPLAY

(71) Applicant: EMPIRE TECHNOLOGY DEVELOPMENT LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 14 days.

(21) Appl. No.: 15/018,959

(22) Filed: Feb. 9, 2016

(65) Prior Publication Data

US 2016/0171676 A1   Jun. 16, 2016

Related U.S. Application Data

(63) Continuation-in-part of application No. 13/394,148, filed as application No. PCT/US2011/043018 on Jul. 6, 2011, now abandoned.

(51) Int. Cl.
*H04N 17/00* (2006.01)
*H04N 21/6379* (2011.01)
(Continued)

(52) U.S. Cl.
CPC ....... *H04N 21/6379* (2013.01); *G06F 3/1415* (2013.01); *G06T 3/4092* (2013.01);
(Continued)

(58) Field of Classification Search
CPC ........... H04N 21/2343; H04N 21/4126; H04N 21/6379; H04N 21/64784; H04N 17/00
(Continued)

(56) References Cited

U.S. PATENT DOCUMENTS

| 7,975,062 B2 | 7/2011 | Krikorian et al. |
| 2002/0193999 A1* | 12/2002 | Keane ................... H04M 7/006 704/270 |

(Continued)

FOREIGN PATENT DOCUMENTS

| CN | 1556660 A | 12/2004 |
| CN | 101247286 A | 8/2008 |

(Continued)

OTHER PUBLICATIONS

European Search Report for counterpart Patent Application No. 11869036.1 dated Feb. 12, 2015.

(Continued)

*Primary Examiner* — Gims S Philippe
*Assistant Examiner* — Albert Kir (57) ABSTRACT

Technologies are generally described for detecting transcoding and adjusting visual content for optimal display on user devices. A content provider may transmit a sample of a visual content to a user device over a service provider network, and may monitor the quality of the sample that the user device receives. The service provider may apply transcoding to the sample during the transmission causing the quality of the sample to be degraded. The content provider may receive a sample as rendered from the user device and may compare the sample as rendered to the visual content to identify a transcoding applied by the service provider network. The content provider may the transcoding to the visual content and may transmit visual content that is transcoded for optimal display over the service provider network to the user device.

17 Claims, 6 Drawing Sheets

(51) Int. Cl.
  *H04L 29/08* (2006.01)
  *G06T 3/40* (2006.01)
  *H04N 21/2343* (2011.01)
  *H04N 21/234* (2011.01)
  *H04N 21/6543* (2011.01)
  *G06F 3/14* (2006.01)
  *H04J 1/16* (2006.01)
  *H04L 12/26* (2006.01)

(52) U.S. Cl.
  CPC ....... *H04L 67/10* (2013.01); *H04N 21/23418* (2013.01); *H04N 21/234309* (2013.01); *H04N 21/234363* (2013.01); *H04N 21/6543* (2013.01); *G09G 2340/02* (2013.01); *G09G 2340/0407* (2013.01); *G09G 2350/00* (2013.01); *G09G 2370/02* (2013.01); *G09G 2370/022* (2013.01); *H04N 21/234381* (2013.01)

(58) Field of Classification Search
  USPC ........ 382/166, 232, 233, 243; 725/105, 123; 348/192; 370/235, 241, 252
  See application file for complete search history.

(56) References Cited

U.S. PATENT DOCUMENTS

| | | |
|---|---|---|
| 2003/0112996 A1 | 6/2003 | Holliman et al. |
| 2006/0005114 A1 | 1/2006 | Williamson et al. |
| 2006/0168323 A1 | 7/2006 | Kim et al. |
| 2008/0066113 A1 | 3/2008 | Skelly |
| 2008/0259799 A1 | 10/2008 | van Beek |
| 2009/0006643 A1 | 1/2009 | Lee |
| 2009/0028428 A1 | 1/2009 | Dovstam et al. |
| 2009/0154368 A1 | 6/2009 | Kim et al. |
| 2010/0146488 A1 | 6/2010 | Chen et al. |
| 2010/0223649 A1 | 9/2010 | Suitts et al. |
| 2011/0161409 A1 | 6/2011 | Nair et al. |
| 2012/0096119 A1 | 4/2012 | Nakamura et al. |

FOREIGN PATENT DOCUMENTS

| | | |
|---|---|---|
| CN | 101529903 A | 11/2009 |
| JP | 2002354417 A | 12/2002 |
| JP | 2003032643 A | 1/2003 |
| JP | 2003230125 A | 8/2003 |
| JP | 2004015429 A | 1/2004 |
| JP | 2005223430 A | 8/2005 |
| JP | 2006155602 A | 6/2006 |
| JP | 2006295663 A | 10/2006 |
| JP | 2009510897 A | 3/2009 |
| JP | 2009290334 A | 12/2009 |
| JP | 2011069325 A | 4/2011 |
| WO | 2011048625 A1 | 4/2011 |

OTHER PUBLICATIONS

Fleishman, G., "Verizon Wireless Sets iPhone Plans and Throttles Data," accessed at http://web.archive.org/web/20110208015850/http://www.tidbits.com/article/11950, Feb. 4, 2011, pp. 2.

International Search Report and Written Opinion for International Application No. PCT/US2011/043018, dated Dec. 2, 2011.

Munchbach, A., "Live from Eric Schmidt's Mobile World Congress keynote!," accessed at http://web.archive.org/web/20110515045738/http://www.bgr.com/2011/02/15/live-from-eric-schmidts-mwc-keynote/, Feb. 15, 2011, pp. 5.

Wang, B., et al., "A New Approach Measuring Users' QoE in the IPTV," Pacific-Asia Conference on Circuits, Communications and Systems, pp. 453-456 (May 16-17, 2009).

* cited by examiner

TRANSCODING DETECTION AND ADJUSTMENT OF CONTENT FOR OPTIMAL DISPLAY

CROSS REFERENCE TO RELATED APPLICATIONS

This Application is a continuation-in-part under 35 U.S.C. § 120 of U.S. patent application Ser. No. 13/394,148 filed on Mar. 4, 2012, now abandoned, which is the U.S. National Stage filing under 35 U.S.C. § 371 of International Application No. PCT/US11/43018, filed on Jul. 6, 2011. The disclosure of U.S. patent application Ser. No. 13/394,148 and International Application No. PCT/US11/43018 are hereby incorporated by reference in their entireties.

BACKGROUND

Unless otherwise indicated herein, the materials described in this section are not prior art to the claims in this application and are not admitted to be prior art by inclusion in this section.

Media content such as videos, images, and other visual content provided through wireless networks such as cellular networks are common in daily usage through mobile or stationary devices like smart phones, desktop computers, and similar ones. Such visual and/or audio content may be directly provided by a service provider (e.g., a cellular service provider) or from a third party content provider (e.g., a search engine, a content creator, advertising media etc.) through the wireless network service provider.

Due to the high bandwidth required for transmitting high quality content over networks, many service providers apply optimization and/or transcoding to the content prior to transmission in order to manage the network bandwidth required for transmitting the content over the network to user devices. Typically, as a result of the transcoding and optimization of the content, the quality of the content that is actually received and delivered on the user devices is significantly decreased from the original quality of the content generated by the content provider. The potential reduction in quality of media content may be problematic for content providers who spend significant amounts of time and money on high quality media content and for users desiring to view high quality media content on their various user devices.

SUMMARY

The present disclosure generally describes techniques for enhancing user experience in still image or video transmission over a network by detecting transcoding at a content provider and adjusting content delivery based on the detected transcoding for providing optimal viewing on a user device. According to some examples, an example method for determining content quality for a visual content transmitted over a service provider network is described. The example method may include receiving a request from a user device to transmit the visual content, transmitting a sample of the visual content and an instruction to send back the sample as rendered by the user device, receiving the sample as rendered from the user device, comparing the sample as rendered to the visual content to identify a transcoding applied to the sample by the service provider network, applying the transcoding to the visual content, and transmitting the visual content to the user device.

According to other embodiments, an content server for determining content quality for a visual content transmitted over a service provider network is described. The content server may include a communication module configured to communicate wirelessly with one or more user devices via a service provider network, a memory configured to store instructions, and one or more processors coupled to the communication module and the memory. The one or more processors of the content server may be configured to receive a request from a user device to transmit the visual content, transmit a sample of the visual content and an instruction to send back the sample as rendered by the user device, receive the sample as rendered from the user device, compare the sample as rendered to the visual content to identify a transcoding applied to the sample by the service provider network, identify a compression scheme used by the transcoding, compress the visual content with the compression scheme, apply the transcoding to the visual content, and transmit the visual content to the user device.

According to other example embodiments, a non-transitory computer-readable storage medium may have instructions stored thereon for determining content quality for a visual content transmitted over a service provider network. The instructions may include receiving a request from a user device to transmit the visual content, transmitting a sample of the visual content and an instruction to send back the sample as rendered by the user device, receiving the sample as rendered from the user device, comparing the sample as rendered to the visual content to identify a transcoding applied to the sample by the service provider network, identifying a compression scheme used by the transcoding, compressing the visual content with the compression scheme, applying the transcoding to the visual content, and transmitting the visual content to the user device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enhancing user experience in still image or video transmission over a network by detecting transcoding at a service provider network and adjusting content delivery based on the detected transcoding.

Briefly stated, a content provider may transmit a sample of a visual content to a user device over a service provider network, and may monitor the quality of the sample that the user device receives. The service provider may apply transcoding to the sample during the transmission causing the quality of the sample to be degraded. The content provider may receive a sample as rendered from the user device and may compare the sample as rendered to the visual content to identify a transcoding applied by the service provider network. The content provider may the transcoding to the visual content and may transmit visual content that is transcoded for optimal display over the service provider network to the user device.

Figure 1:
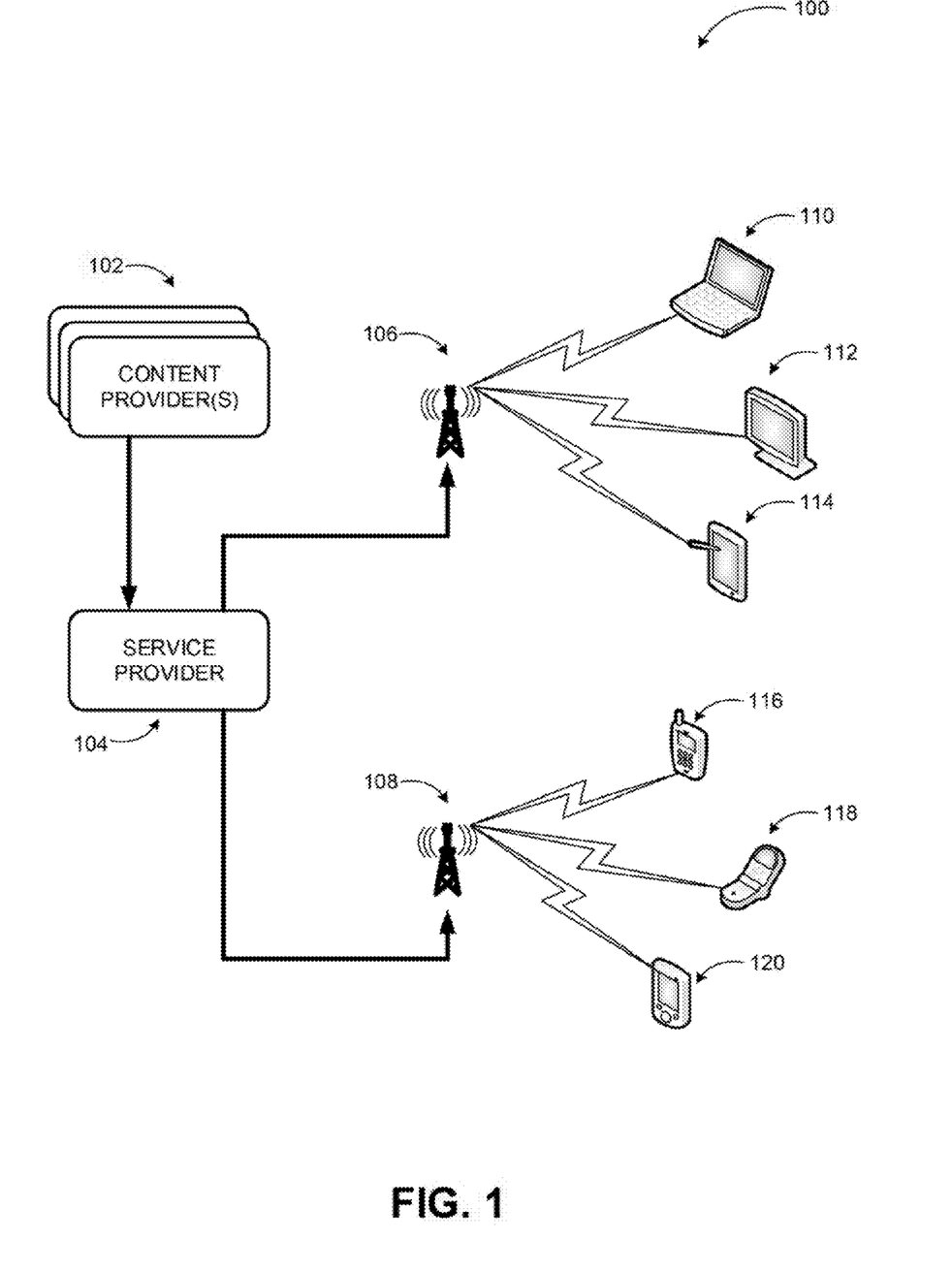
FIG. 1 is a diagram of an illustrative example system transmitting visual content to a variety of user devices.

FIG. 1 is an illustrative example system transmitting visual content to a variety of user devices. While video transmission is used in example descriptions herein, embodiments may be implemented in systems transmitting video and/or audio content over wireless networks to mobile and stationary user devices.

Diagram 100 shows a service provider 104 receiving visual content (video/image) from one or more content providers 102. Content providers 102 may be part of the service provider or may be separate entities. For example, service provider 104 may be a cellular service provider, which may generate some of the visual content itself. Other visual content may be received from third party content providers. Service provider 104 may facilitate communications between various user devices and/or transmit visual content to the user devices over one or more networks. The transmission may involve transmission towers, access points, and comparable transceivers (106, 108).

In the example system of diagram 100, the service provider may use transceivers 106 and 108 within a service provider network to communicate wirelessly with user devices such as laptop computer 110, desktop computer 112, portable computer 114, smart phone 116, cellular phone 118, and wireless personal digital assistant (PDA) 120. A user device may include other portable or stationary computing devices, (e.g. a vehicle-mount computing device) capable of wireless communication and playback of received visual content. A service provider network may also be a wired data network, a wireless data network, a cellular network, or a combination of those capable of transmitting content to user devices.

Transmission of visual content to user devices from a service provider and/or content provider over a service provider network may require large network bandwidth due to the size of the high quality visual content being transmitted. Consequently, many service providers may optimize and/or transcode the visual content prior to transmission in order to manage or reduce the network bandwidth used during transmission, resulting in a reduction in the quality of the visual content that is transmitted to the user devices.

A system according to embodiments provides the capability for the content provider 102 to monitor the quality of the visual content that is transmitted over the service provider network and ultimately received on a user device, and to evaluate the optimization and/or transcoding that is applied to the visual content by the service provider during transmission to the user device(s). The content provider 102 may be able to apply universal techniques for evaluating the optimization and/or transcoding applied to the visual content by the service provider and determining the quality of the visual content received on the user devices. From the determination of the quality of the visual content that is received on the user device(s), the content provider 102 may adapt the size, packaging, resolution, timing, content, and similar quality aspects of the visual content that it sends to the service provider network for transmission to the user device(s) to match the quality of service that is received by the user device(s) for optimal viewing of the visual content.

Figure 2:
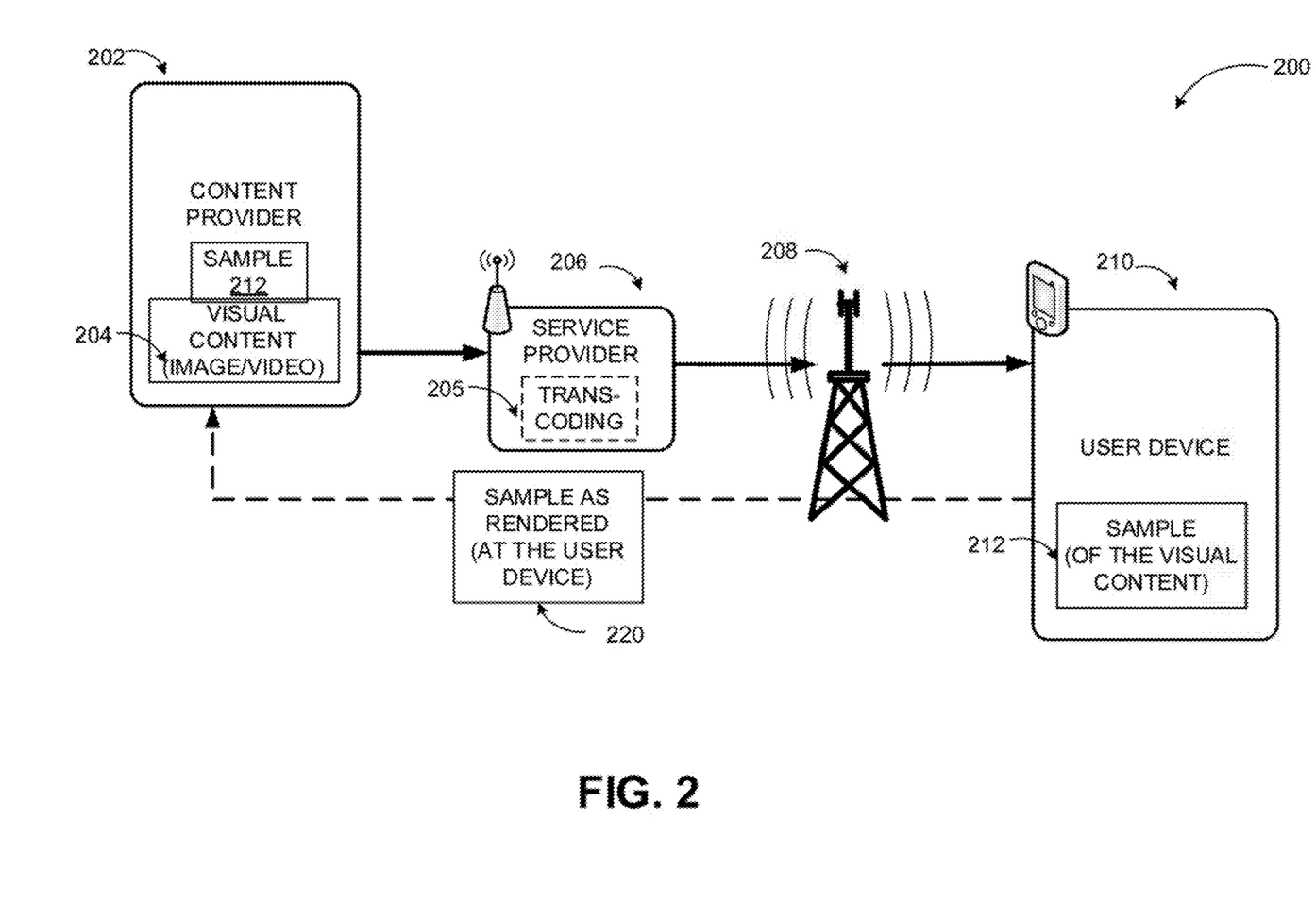
FIG. 2 conceptually illustrates an example system for determining quality of visual content transmitted over a service provider to a user device.

FIG. 2 conceptually illustrates an example system for determining the quality of visual content transmitted over a service provider to a user device, arranged in accordance with at least some embodiments described herein.

Diagram 200 illustrates one example configuration of a system according to some embodiments, where visual content is received from a content provider 202 at a service provider 206, optimization and/or transcoding 205 is applied to the visual content at the service provider 206 for transmission to a user device and a sample of the delivered visual content from the user device is returned to the content provider.

According to an example scenario, content provider 202 may generate visual content 204 for ultimate viewing on a user device 210. The visual content 204 may be a media object, and may be, for example, a still image or a video stream. The content provider 202 may transmit a sample 212 of the visual content 204 to determine a transcoding applied to sample 212 by the service provider 206. The sample 212 may include a section of the visual content 204 (for example, a section of an image or a selection from a video stream). Alternatively, the sample 212 may include an entirety of the visual content 204.

Service provider 206 (e.g., a cellular service provider) may receive the sample 212, which may be in a compressible format, from content provider 202, and may transmit the sample 212 via transceiver 208 to user device 210. In an example scenario, the service provider 206 may apply optimization and/or transcoding 205 to the sample 212 in order to minimize the required bandwidth for transmitting the sample 212 to the user device 210. Because transcoding 205 is typically a lossy process resulting in degradation of the quality of the sample, when the service provider 206 applies transcoding 205 to the sample 212 in order to reduce or compress the file size, the quality of the sample 212 on the user device may be significantly decreased from the quality of the visual content 204.

In a system according to embodiments, the content provider 202 may instruct user device 210 to transmit back to the content provider a rendering of the sample 212 on the user device 210 as a sample as rendered 220. The sample as rendered 220 may be a media object, which may be independent of the hardware and/or software components of the user device 210. In an example embodiment, the sample as rendered 220 may be an uncompressed or a lossless sample of the sample 212, such that the content provider 202 may receive an accurate representation of the quality of the sample 212 received by the user device 210. The content provider 202 may analyze the sample as rendered 220 to determine whether optimization and/or transcoding 205 was applied to the sample 212 by the service provider 206, and may evaluate the quality of the sample 212 that ultimately reaches the user device 210 over the service provider network. The content provider 202 may compare the sample as rendered 220 with the visual content 204. From the comparison the content provider 202 may determine the degree of optimization and/or transcoding applied to the visual content and the sample 212 received at the user device 210.

Based on the evaluation of the transcoding applied to the sample 212, the content provider 202 may determine an appropriate set of parameters for providing an optimal view of the visual content on the user device 210. The content provider 202 may adjust quality aspects of the visual content 204 to match the determined appropriate quality for the user device based on the evaluation. For example, the content provider 202 may adjust image size, file size, an image resolution, and/or transmission parameters. The content provider 202 may also adjust other quality aspects and/or parameters of the visual content which may affect the quality of the visual content. The quality aspects of the visual content may be optimized to match the visual content quality that the user device 210 actually receives for providing an optimal viewing experience on the user device 210. In another example embodiment, the content provider may select an alternate type of visual content that most appropriately matches the quality of the visual content that the user device receives. The content provider may transmit further visual content with the adjusted quality aspects over the service provider network to the user device 210.

Figure 3:
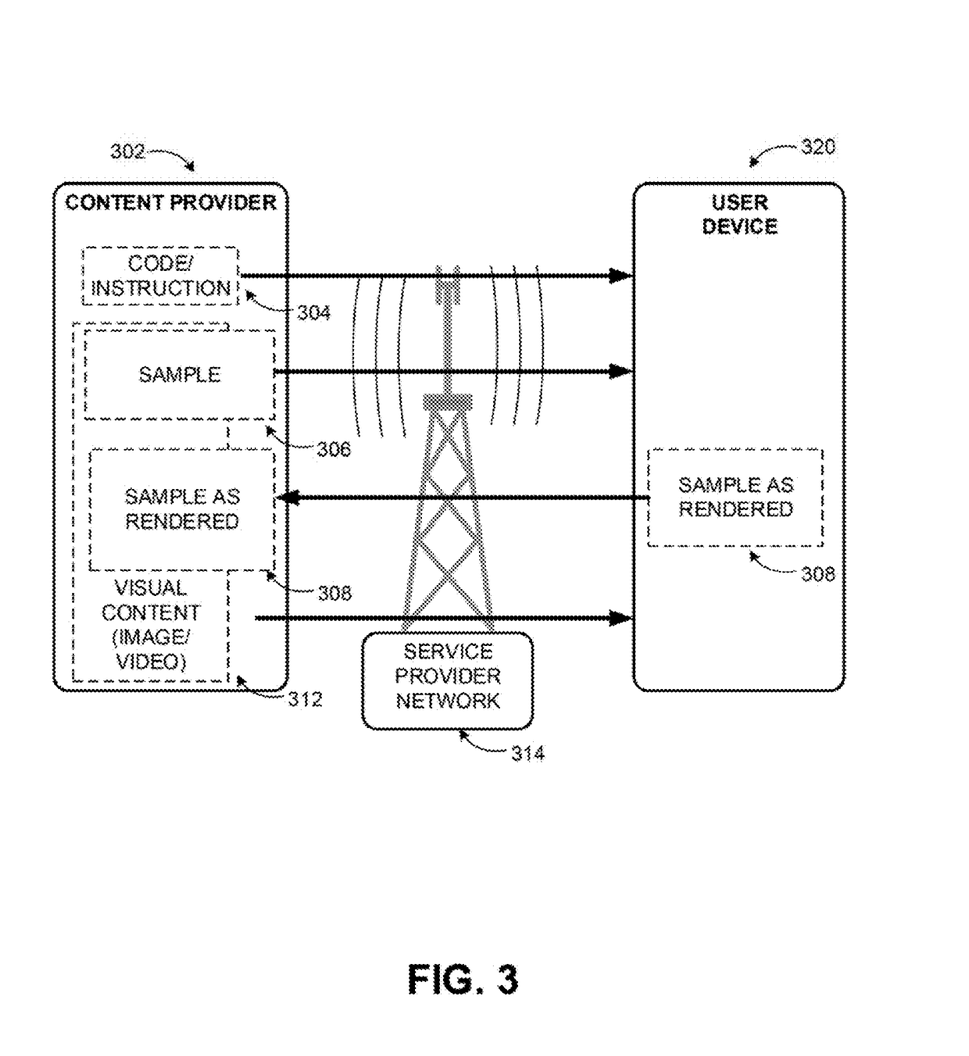
FIG. 3 illustrates an example system for transmitting and testing visual content quality over a service provider network.

FIG. 3 illustrates an example system for transmitting and testing visual content quality over a service provider network, arranged in accordance with at least some embodiments described herein. In a system according to embodiments, the content provider 302 may provide an approach for transmitting a sample 306 (of a visual content 312) over a service provider network 314 to a user device 320 and receiving back a sample as rendered 310 that can be evaluated to determine the quality of the sample 306 that reaches the user device 320 over the service provider network 314.

As described in conjunction with FIG. 2, the content provider 302 may generate the sample 306 from the visual content 312 for transmission over the service provider network 314 to a user device 320. The service provider network 314 may optimize and/or transcode the sample 306 during a transmission to the user device 320. The user device 320 may receive the sample 306 and display the sample 306 as the sample as rendered 308. Due to the transcoding by the service provider network 314, the quality of the sample as rendered 308 may be lower than the sample 306. Next, in response to an instruction to send back the sample as rendered 308, the content provider 302 may receive the sample as rendered 308 and compare the sample as rendered 308 with the sample 306. Based on the comparison, the content provider may identify the transcoding that was applied to the sample 306 and determine the quality of the sample as rendered 308 that is received (and/or displayed) at the user device. The comparison may be used to select an appropriate type of the visual content 312 to deliver and to optimize a viewing experience on the user device given the transcoding that may be applied by the service provider network to the visual content 312. The content provider may adjust quality aspects of the visual content 312 and may transit the visual content 312 to the user device 320 for optimal viewing on the user device 320.

In an example scenario shown in diagram 300, in order to facilitate the transmission of the sample 306 and the receipt of the sample as rendered 308, the content provider 302 may generate and deliver code/instruction 304 providing for transmission of the sample 306 to the user device 320 and sending back the sample as rendered 308 on the user device 320.

An example of the code/instruction 304 providing for the transmission of the sample 306 and receipt of the sample as rendered 308 may be HTML5 compatible language. Using HTML5 language, the code/instruction 304 may include a canvas element using the "context.drawImage( )" function to deliver a media object or jpg file, and the code/instruction 304 may include the "oCanvas.toDataURL( )" function to return a base64 encoded media object or png file of the image as the service provider delivered the sample as rendered 308 and it was delivered on the user device.

In a system according to embodiments, the code/instruction 304 may instruct the user device 320 to transmit the sample as rendered 308 as uncompressed or a in a lossless format over the service provider network 314, such that the content provider 302 may receive an accurate representation of the quality of the sample as rendered 308. In some scenarios, to prevent the service provider network 314 from transcoding the sample as rendered 308, the code/instruction 304 may instruct user device to encrypt the sample as rendered 308 prior to transmission back to the content provider 302. The code/instruction 304 may also instruct the user device 320 to transmit a decryption key to allow the content provider to decrypt the sample as rendered 308 that is encrypted. Additionally, the code/instruction 304 may instruct the user device to modify a header and a description of the sample as rendered 308 prior to transmission back to the content provider 302 to prevent the service provider network 314 to further transcode the sample as rendered 308.

In a further embodiment, the content provider 30 may transmit the code/instruction 304 to the user device 320 to render the sample 306 as invisible a user of the user device 320. The code/instruction 304 may instruct the user device to render the sample 306 outside of a display of the user device 320, and as such, is not viewable or detectable by the user.

The sample 306 may be a section of an image, a default test image, a section of a video stream, a test video stream, or a sample image or video extracted from the visual content 312. The content provider 302 may receive the sample as rendered 308 as it is delivered on the user device 320, and may determine the transcoding applied to the sample 306. The content provider 302 may adjust the quality aspects of the visual content according to the determined transcoding, and subsequently may transmit the visual content 312 with adjusted quality aspects for optimal viewing on the user device. Since, the content provider may duplicate operations of the service provider network to transcode the visual content 312 through the transcoding (determined from the sample as rendered 308) applied on the visual content 312, the service provider network 314 may be prevented from further transcoding the visual content 312. The visual content 312 transcoded by the content provider 302 may be delivered to the user device 320 in a same visual quality as sent by the content provider 302.

In a further embodiment, the content provider 302 may determine whether to perform initial testing of visual content quality by sending the sample 306 over the service provider network 314 based on identification of the service provider. For example, a specific service provider may be previously known to not optimize or transcode transmitted visual content, and therefore, no initial testing or evaluation of the sample 306 may be necessary. In another scenario, the content provider may have previously determined the degree and type of optimization and/or transcoding applied by specific service providers, and the content provider may have determined the transcoding (matching the identification of the service provider network 314) to apply to the visual content 312 without transmitting the sample 306 and the code/instruction 304 to send back the sample as rendered 308. In such a scenario, the content provider 302 may apply the transcoding to the visual content 312 directly in response to the identification of the service provider network 314.

In another embodiment, the content provider 302 may identify a compression scheme used by the transcoding. The compression scheme may include a compression applied to an image or a video stream used as the sample 306. The content provider 302 may compress the visual content 312 with the compression scheme prior to transmitting the visual content 312 (that is compressed) through the service provider network 314. The service provider network 314 may not further compress the visual content 312 that is compressed (by the content provider 302). As such a visual quality of the visual content 312 may be guaranteed to match the visual quality of the visual content 312 upon delivery at the user device 320.

Alternatively, the content provider 302 may receive a request from the user device which defines the visual content 312 (received at the user device 320) as failing to meet a visual quality threshold for rendering at the user device 320. The transcoding (of the service provider network 314) applied on the visual content 312 by the content provider 302 may be deemed as insufficient to meet the content quality threshold at the user device 320 (due to heavy compression, insufficient file allocation to a video stream, and/or among other reasons). In response, the content provider 302 may adjust the compression scheme applied on the visual content 312 to improve the visual quality of the visual content 312 to be transmitted to the user device 320. The visual content 312 may be compressed with the adjusted compression scheme and the visual content 312 that is compressed may be re-transmitted to the user device 320.

In an alternative example, the content provider may locate an alternative visual content that is related to the visual content in response to receiving a request from the user device 320 that defines the visual content 312 as failing to meet a visual quality threshold. The content provider 302 may locate the alternative visual content by searching a visual content source (which may be an external provider or a component of the content provider 302). The alternative visual content may be related to the visual content 312 through an attribute such as an applied compression scheme, a title, a subject, a category, and/or a duration, among other attributes. Next, the alternative visual content may be transcoded with the transcoding associated with the service provider network through operations such a compression with a compression scheme associated with the service provider network 314. The alternative visual content (that is transcoded) may be transmitted to the user device 320.

While embodiments have been discussed above using specific examples, components, scenarios, and configurations in FIG. 1 through FIG. 3, they are intended to provide a general guideline to be used for determining transcoding applied by a service provider network to visual content and adjusting the visual content quality for optimal viewing on a user device. These examples do not constitute a limitation on the embodiments, which may be implemented using other components, frame selection schemes, and configurations using the principles described herein. Furthermore, embodiments may be implemented for content received at stationary or vehicle mount devices, and applicable to audio, video, or comparable content.

Figure 4:
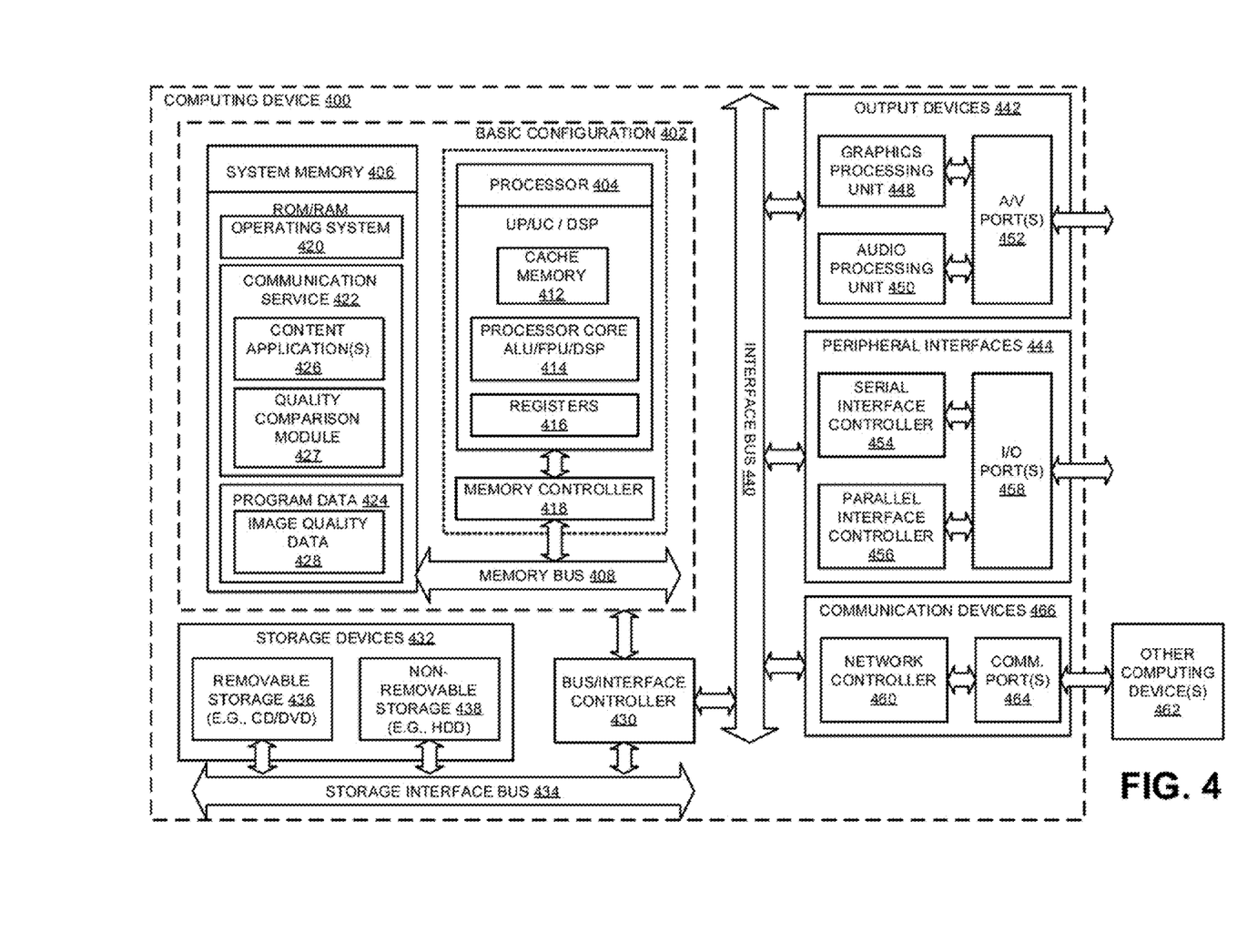
FIG. 4 illustrates a general purpose computing device, which may be used to implement visual content quality detection over a service provider network.

FIG. 4 illustrates a general purpose computing device, which may be used to implement image quality detection over a service provider network, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level cache memory 412, a processor core 414, and registers 414. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 415 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, a communication service 422, one or more content application(s) 426, and quality comparison module 427. System memory 406 may further include program data 424 and image quality data 428. Communication service 422 may provide audio/visual content to users among other things. Content application(s) 426 may each be associated with a particular type of content to be provided to users. Quality comparison module 427 may compare a sample as rendered with visual content for determining applied optimization and/or transcoding by the service provider network. Image quality data 428 may be stored in local or remote data stores for subsequent use. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 666 to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 400 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are configured to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
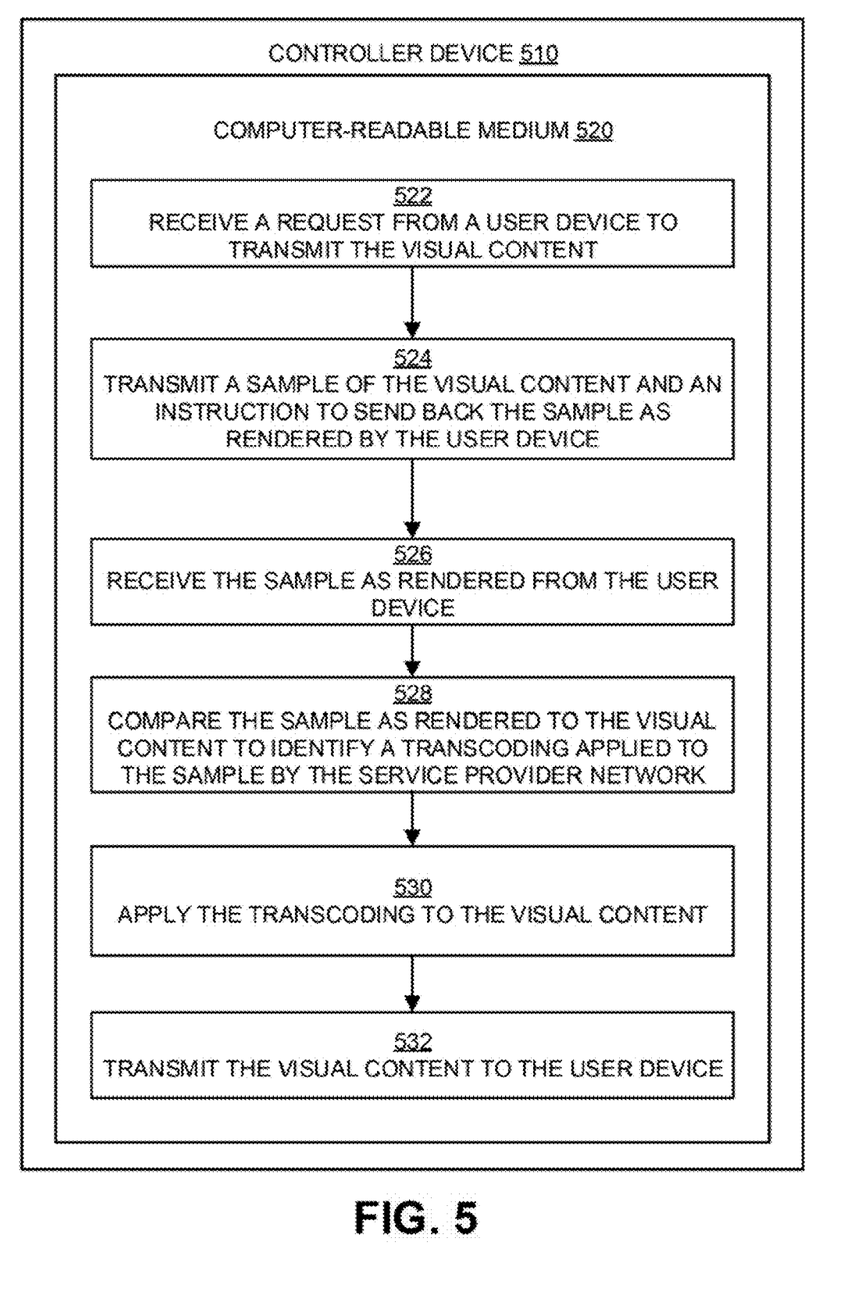
FIG. 5 is a flow diagram illustrating an example method that may be performed by a computing device such as device 400 in FIG. 4.

FIG. 5 is a flow diagram illustrating an example method that may be performed by a computing device such as device 400 in FIG. 4, arranged in accordance with at least some embodiments described herein.

An example process according to embodiments may begin with operation 522, "receive a request from a user device to transmit the visual content", where a content provider may receive a request for a visual content, including a video stream and an image for transmission to user devices. Operation 522 may be followed by operation 524, "transmit a sample of the visual content and an instruction to send back the sample as rendered by the user device", where the content provider may transmit a sample of the visual content over the service provider network to one or more user devices over one or more wireless networks. The user device(s) may receive the sample for rendering on the interface of the user device. Operation 524 may be followed by operation 526, "RECEIVE THE SAMPLE AS RENDERED FROM THE USER DEVICE", where the content provider may receive the sample as rendered from the user device, which may be encrypted to prevent the service provider network from further transcoding the sample as rendered.

Operation 526 may be followed by operation 528, "COMPARE THE SAMPLE AS RENDERED TO THE VISUAL CONTENT TO IDENTIFY A TRANSCODING APPLIED TO THE SAMPLE BY THE SERVICE PROVIDER NETWORK", where the content provider may compare the sample as rendered with the visual content (or the sample) and may determine whether the sample has been subject to transcoding and/or optimization based on the comparison. The content provider may evaluate the transcoding and/or optimization applied to the visual content by the service provider network. At subsequent operation 530, "APPLY THE TRANSCODING TO THE VISUAL CONTENT", the content provider may adjust one or more quality aspects of the visual content based on the transcoding applied on the sample as rendered. Operation 530 may be followed by operation 532, "TRANSMIT ADJUSTED VISUAL CONTENT TO USER DEVICE", where the content provider may transmit further visual content with adjusted quality aspects for optimal display over the service provider network to user device(s).

The operations included in the processes of FIG. 5 described above are for illustration purposes. Detection of transcoding and optimization of a sample of the visual content by service providers and adjustment of the visual content for optimal display may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 6:
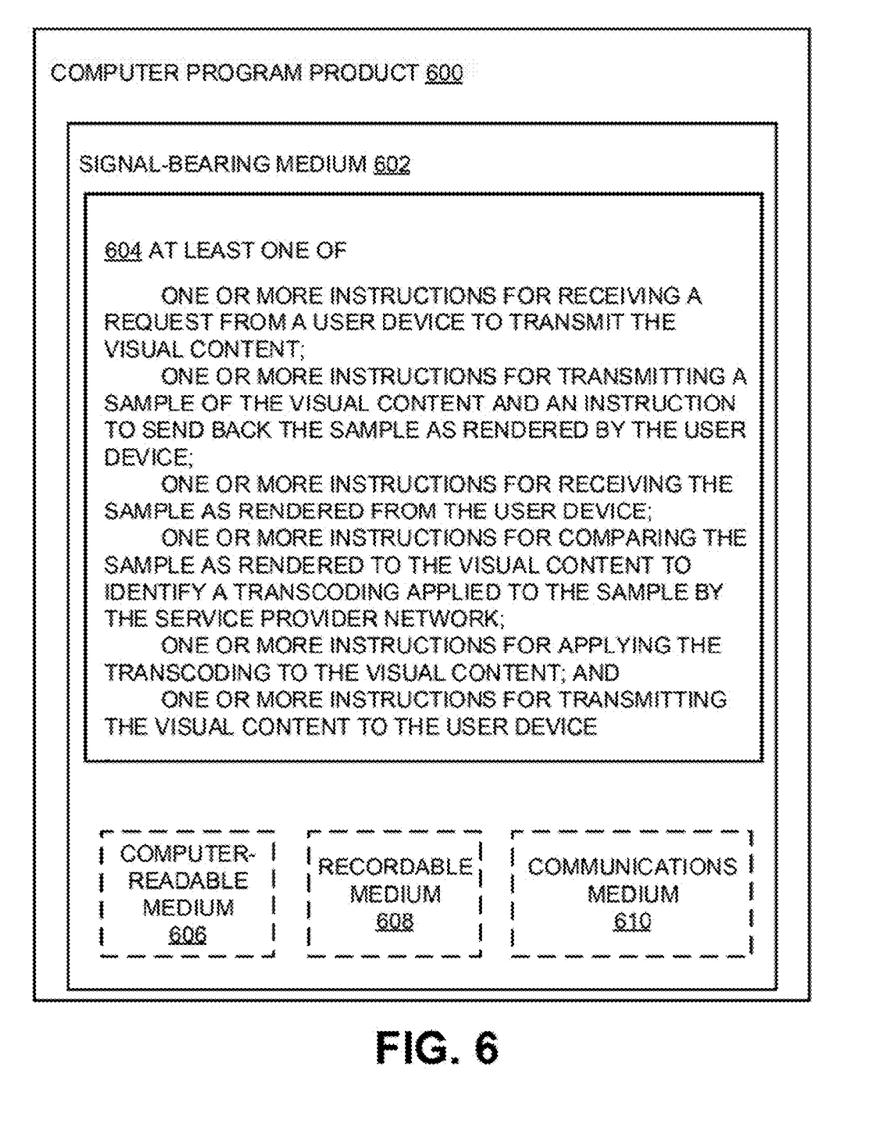
FIG. 6 illustrates a block diagram of an example computer program product to be used by a server of a content provider, all arranged in accordance with at least some embodiments described herein.

FIG. 6 illustrates a block diagram of an example computer program product to be used by a server of a content provider, arranged in accordance with at least some embodiments described herein.

In some examples, as shown in FIG. 6, computer program product 600 may include a signal bearing medium 602 that may also include machine readable instructions 604 that, when executed by, for example, a processor, may provide the functionality described above with respect to FIG. 1 through FIG. 3. Thus, for example, referring to processor 404, one or more of the tasks shown in FIG. 6 may be undertaken in response to instructions 604 conveyed to the processor 404 by medium 602 to perform actions associated with computation of mobile content quality of experience in real-time as described herein. Some of those instructions may include transmitting a sample of a visual content over service provider network(s) to user device(s), receiving a sample as rendered from user device(s), comparing sample as rendered and to the visual content (or the sample), and adjust visual content for optimal viewing on user device(s).

In some implementations, signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to the processor 404 by an RF signal bearing medium 602, where the signal bearing medium 602 is conveyed by a wireless communications medium 610 (e.g., a wireless communications medium conforming with the IEEE 802.11 standard).

While FIG. 6 is described using visual content as example for transcoding detection and content adjustment, the principles described herein apply to still images, audio, and similar content as well. Moreover, tasks performed in response to the instructions may be shared among service providers, content providers, and user devices in various combinations.

In some examples, a method for determining content quality for a visual content transmitted over a service network may be described. The method may include receiving a request from a user device to transmit the visual content, transmitting a sample of the visual content and an instruction to send back the sample as rendered by the user device, receiving the sample as rendered from the user device, comparing the sample as rendered to the visual content to identify a transcoding applied to the sample by the service provider network, applying the transcoding to the visual content, and transmitting the visual content to the user device.

In other examples, the visual content is an image or a video stream. The instruction directs the user device to render the sample as invisible to a user. The instruction directs the user device to encrypt the sample as rendered to prevent the service provider network to apply another transcoding to the sample as rendered during a return transmission. Applying the transcoding to the visual content includes adjusting one or more of a resolution of the visual content, a file size of the visual content, a frame rate of the visual content, and a transmission parameter associated with the visual content.

In further examples, the method further includes adjusting quality attributes of the visual content based on an identification of the service provider network. The sample as rendered is a media object. The media object is independent of a hardware and a software component of the user device. The instruction directs the user device to modify a header and a description of the sample as rendered to prevent detection of the sample as rendered as another visual content by the service provider network. The method further includes identifying a compression scheme used by the transcoding and compressing the visual content with the compression scheme.

In some examples, a content server for determining content quality for a visual content transmitted over a service provider network is described. The server includes a communication module configured to communicate wirelessly with one or more user devices via a service provider network, a memory configured to store instructions, and one or more processors coupled to the communication module and the memory. The one or more processors are configured to receive a request from a user device to transmit the visual content, transmit a sample of the visual content and an instruction to send back the sample as rendered by the user device, receive the sample as rendered from the user device, compare the sample as rendered to the visual content to identify a transcoding applied to the sample by the service provider network, identify a compression scheme used by the transcoding, compress the visual content with the compression scheme, apply the transcoding to the visual content, and transmit the visual content to the user device.

In other examples, the instruction directs the user device to render the sample outside a viewing area of a display of the user device. The content server is further configured to receive another request from the user device, where the other request defines the visual content as failing to meet a visual quality threshold for rendering at the user device. The content server is further configured to adjust the compression scheme to improve a visual quality of the visual content, compress the visual content with the compression scheme, and re-transmit the visual content to the user device. The content server is further configured to locate an alternative visual content that is related to the visual content by searching a visual content source, where one or more attributes of the alternative visual content match the visual content and transmit the alternative visual content to the user device. The one or more attributes include the compression scheme, a title, a subject, and a category of the alternative visual content. The user device is one of: a portable computing device, a vehicle-mount computing device, a stationary computing device, or a smart phone.

In some examples, a non-transitory computer-readable storage medium with instructions stored thereon for determining content quality for a visual content transmitted over a service provider network is described. The instruction include actions that are similar to the actions of the content server.

In some examples, a means for determining content quality for a visual content transmitted over a service provider network is described. The means for determining content quality for a visual content transmitted over a service provider network includes a means for receiving a request from a user device to transmit the visual content, a means for transmitting a sample of the visual content and an instruction to send back the sample as rendered by the user device, a means for receiving the sample as rendered from the user device, a means for comparing the sample as rendered to the visual content to identify a transcoding applied to the sample by the service provider network, a means for applying the transcoding to the visual content, and a means for transmitting the visual content to the user device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method by a content server to determine content quality for visual content transmitted over a service provider network, the method comprising:

receiving a request from a user device to transmit the visual content, wherein the visual content includes a video stream;

transmitting, to the user device over the service provider network, a sample of the visual content and an instruction to send back the sample, wherein a transcoding is applied by the service provider network to the sample during transmission of the sample to the user device, wherein the sample includes one or more frames of the video stream, and wherein the instruction prompts the user device to:

modify a header and a description of the sample to generate a sample as rendered by the user device;

encrypt the sample as rendered, prior to transmission of the sample as rendered to the content server; and transmit a decryption key to decrypt the encrypted sample as rendered;

receiving, from the user device, the encrypted sample as rendered and the decryption key, wherein the encrypted sample as rendered includes an encrypted sample having the modified header and the modified description, and wherein the modified header, the modified description, and the encryption of the sample prevent the encrypted sample as rendered from being detected by the service provider network as another visual content, and further prevent the encrypted sample as rendered from being transcoded by the service provider network during transmission of the encrypted sample as rendered from the user device to the content server;

decrypting, by use of the decryption key, the encrypted sample as rendered;

comparing the decrypted sample as rendered to the visual content to identify a transcoding applied to the sample, by the service provider network, during transmission of the sample from the content server to the user device;

identifying a compression scheme used in application of the transcoding;

applying the transcoding to the visual content, wherein the application of the transcoding includes compression of the visual content with the compression scheme; and transmitting the visual content, as transcoded, to the user device.

2. The method according to claim 1, wherein transmitting the instruction to send back the sample as rendered by the user device comprises transmitting an instruction that directs the user device to render the sample as invisible to a user.

3. The method according to claim 1, wherein applying the transcoding to the visual content includes adjusting one or more of a resolution of the visual content, a file size of the visual content, a frame rate of the visual content, and a transmission parameter associated with the visual content.

4. The method according to claim 1, wherein applying the transcoding to the visual content includes adjusting quality attributes of the visual content based on an identification of the service provider network.

5. The method according to claim 1, wherein receiving the encrypted sample as rendered includes receiving a media object.

6. The method according to claim 5, wherein receiving the media object includes receiving a media object that is independent of a hardware component and a software component of the user device.

7. A content server to determine content quality for visual content transmitted over a service provider network, the content server comprising:

a communication device configured to communicate wirelessly with one or more user devices via the service provider network;

one or more processors coupled to the communication device, wherein the one or more processors are configured to:

receive, via the communication device, from a user device of the one or more user devices, a request to transmit the visual content, wherein the visual content includes a video stream;

transmit, to the user device over the service provider network, via the communication device, a sample of the visual content and an instruction to send back the sample, wherein a transcoding is applied by the service provider network to the sample during transmission of the sample to the user device, wherein the sample includes one or more frames of the video stream, and wherein the instruction prompts the user device to:

modify a header and a description of the sample to generate a sample as rendered by the user device;

encrypt the sample as rendered, prior to transmission of the sample as rendered to the content server; and transmit a decryption key to decrypt the encrypted sample as rendered;

receive, from the user device, via the communication device, the encrypted sample as rendered and the decryption key, wherein the encrypted sample as rendered includes an encrypted sample having the modified header and the modified description, and wherein the modified header, the modified description, and the encryption of the sample prevent the encrypted sample as rendered from being detected by the service provider network as another visual content, and further prevent the encrypted sample as rendered from being transcoded by the service provider network during transmission of the encrypted sample as rendered from the user device to the content server;

decrypt, by use of the decryption key, the encrypted sample as rendered;

compare the decrypted sample as rendered to the visual content to identify a transcoding applied to the sample, by the service provider network, during transmission of the sample from the content server to the user device;

identify a compression scheme used in application of the transcoding;

apply the transcoding to the visual content, wherein the application of the transcoding includes compression of the visual content with the compression scheme; and transmit, via the communication device, the visual content, as transcoded, to the user device.

8. The content server of claim 7, wherein to transmit the instruction to send back the sample by the user device, the one or more processors are configured to transmit, via the communication device, an instruction that directs the user device to render the sample outside a viewing area of a display of the user device.

9. The content server of claim 7, wherein the one or more processors are further configured to:

receive, via the communication device, another request from the user device, wherein the other request defines the visual content as failing to meet a visual quality threshold for rendering at the user device.

10. The content server of claim 9, wherein the one or more processors are further configured to:

adjust the compression scheme to improve a visual quality of the visual content;

compress the visual content with the adjusted compression scheme; and re-transmit, via the communication device, the visual content to the user device.

11. The content server of claim 9, wherein the one or more processors are further configured to:

locate an alternative visual content that is related to the visual content by a search of a visual content source, wherein one or more attributes of the alternative visual content match the visual content; and transmit, via the communication device, the alternative visual content to the user device.

12. The content server of claim 11, wherein the one or more attributes include the compression scheme, a title, a subject, and a category of the alternative visual content.

13. The content server of claim 7, wherein the user device includes one of: a portable computing device, a vehicle-mount computing device, a stationary computing device, or a smart phone.

14. A non-transitory computer-readable storage medium with instructions stored thereon, which in response to execution by a processor of a content server determine content quality for a visual content transmitted over a service provider network, the instructions being executable by the processor to perform operations or control performance of operations that comprise:

identify a request received from a user device to transmit the visual content, wherein the visual content includes a video stream;

send, to the user device over the service provider network, a sample of the visual content and an instruction to send back the sample, wherein a transcoding is applied by the service provider network to the sample during transmission of the sample to the user device, wherein the sample includes one or more frames of the video stream, and wherein the instruction prompts the user device to:
  modify a header and a description of the sample to generate a sample as rendered by the user device;
  encrypt the sample as rendered, prior to transmission of the sample as rendered to the content server; and
  transmit a decryption key to decrypt the encrypted sample as rendered;
determine that the encrypted sample as rendered and the decryption key have been received from the user device, wherein the encrypted sample as rendered includes an encrypted sample having the modified header and the modified description, and wherein the modified header, the modified description, and the encryption of the sample prevent the encrypted sample as rendered from being detected by the service provider network as another visual content, and further prevent the encrypted sample as rendered from being transcoded by the service provider network during transmission of the encrypted sample as rendered from the user device to the content server;
decrypt, by use of the decryption key, the encrypted sample as rendered;
compare the decrypted sample as rendered to the visual content to identify a transcoding applied to the sample, by the service provider network, during transmission of the sample from the content server to the user device;
identify a compression scheme used in application of the transcoding;
apply the transcoding to the visual content, wherein the application of the transcoding includes compression of the visual content with the compression scheme; and
send the visual content, as transcoded, to the user device.

15. The non-transitory computer-readable storage medium of claim 14, wherein the sample as rendered includes a media object, and wherein the media object is independent of a hardware component and a software component of the user device.

16. The non-transitory computer-readable storage medium of claim 14, wherein the operations further comprise:
  identify another request from the user device, wherein the other request defines the visual content as failing to meet a visual quality threshold for rendering at the user device;
  adjust the compression scheme to improve a visual quality of the visual content;
  compress the visual content with the adjusted compression scheme; and
  re-send the visual content to the user device.

17. The non-transitory computer-readable storage medium of claim 16, wherein the visual content fails to meet the visual quality threshold due to either or both: heavy compression and insufficient file allocation to the video stream.

* * * * *

UNITED STATES PATENT AND TRADEMARK OFFICE
CERTIFICATE OF CORRECTION

PATENT NO.       : 10,015,559 B2
APPLICATION NO.  : 15/018959
DATED            : July 3, 2018
INVENTOR(S)      : Ezekiel Kruglick Page 1 of 1

It is certified that error appears in the above-identified patent and that said Letters Patent is hereby corrected as shown below:

In the Claims

Column 17, Line 9, please delete "the instruction to send back the sample as rendered by the-" and insert thereto: -- the instruction to send back the sample by the --

Signed and Sealed this
Seventh Day of May, 2019

Andrei Iancu
*Director of the United States Patent and Trademark Office*